United States Patent [19]

Anderson

[11] Patent Number: 4,913,425

[45] Date of Patent: Apr. 3, 1990

[54] PORTABLE SAWBUCK

[76] Inventor: Gerald R. Anderson, 5680 Spokane Ranch Rd., East Helena, Mont. 59635

[21] Appl. No.: 303,304

[22] Filed: Jan. 30, 1989

[51] Int. Cl.[4] .................................................. B23Q 3/02

[52] U.S. Cl. ........................................ 269/97; 269/253

[58] Field of Search ...................... 269/97, 98, 53, 252, 269/253, 95, 296

[56] References Cited

U.S. PATENT DOCUMENTS

| | | | |
|---|---|---|---|
| 713,948 | 11/1902 | Bryant et al. | 269/98 |
| 956,039 | 4/1910 | Carle | 269/97 |
| 1,204,734 | 11/1916 | Benson | 269/97 |
| 1,225,301 | 5/1917 | Wolfe | 269/97 |
| 4,002,328 | 1/1977 | Wolf et al. | 269/97 |
| 4,468,018 | 8/1984 | Vaizey | 269/53 |

*Primary Examiner*—Robert C. Watson
*Attorney, Agent, or Firm*—Michael J. Tavella

[57] ABSTRACT

A portable sawbuck is disclosed that uses three plates to form both a clamp and a vice. The center plate acts a both a clamp plate and a vice plate. The clamp portion can be attached to trees or any other vertical wood post. Four carriage bolts secure the clamp to the tree or post. The vice extends from the opposite side of the clamp and consists of a yoke and the third plate, which rides on the yoke. A threaded rod, which is welded to the third plate and crank are used to operate the vice. Logs are placed in the vice and are rested on the yoke as the vice is tightened. Once secure, the log can be cut on either end, working toward the sawbuck. Logs can be cut to within inches of the sawbuck. A series of spikes are welded or otherwise attached to the plates to further secure the logs to the vice and the clamp to the tree or post. The spikes also reduce the turning moment placed on the sawbuck as logs are cut. The vice portion can also be used without the clamp by clamping the yoke to sawhorses using "U" clamps. The device is intended to be made in kit form for easy shipping and can be readily disassembled for storage.

7 Claims, 5 Drawing Sheets

PORTABLE SAWBUCK

BACKGROUND OF THE INVENTION

This invention is related to portable sawbucks, and particularly to sawbucks that are supported by posts and the like.

BACKGROUND OF THE INVENTION

People have cut wood for centuries for fuel and to clear land for development. Trees are felled at their full length, and then are cut down into manageable pieces. This wood is typically cut to length with chain saws. To prevent the saws from touching the ground, the wood to be cut is usually supported by a crib structure called a sawbuck. Typically, sawbucks are free standing devices and can be as simple as two sawhorses. Examples of sawbucks can be found in U.S. Pat. Nos. 162,799, 1,620,061, 3,034,546, 4,133,412, 4,325,543, 4,454,929. These sawbucks typically have either cross members, vertical members, or a combination of both. Some sawbucks can also be folded for easier handling and storage. Although all of these devices are useful and make cutting wood easier, they have some drawbacks, e.g., these devices must be set upon fairly level ground for safe use. On hills, the sawbucks could collapse and injure the wood cutter. Another difficulty is that some of these devices need a lot of room to set up and store. Some have rods or other support members that can foul the chain saw and possibly cause a dangerous kickback of the saw blade.

The present invention overcomes all of these difficulties. It is designed to bolt to a tree or post for support. Once bolted to its support, the sawbuck uses a vise to grip the wood to be cut. The wood is held by the vice and is open and exposed for cutting on both sides of the vice to the ends of the logs. There are no members or rods that might impact a saw. Also, once a log is locked into place it can be cut completely without further adjustment or having to set down the saw at all. Another advantage of this device compared to the traditional frame sawhorses is that the instant invention can be set on the tree or support at the height best suited to the user. The other sawbucks are locked into one height Finally, the device can be used with conventional saw horses, instead of a post, by bolting the wood supports to the saw horses.

It is an object of this invention to produce a portable sawbuck that uses a tree or post for support.

It is another object of this invention to provide a narrow log carrier that enables a log to be but into usable lengths without interference from rods or other sawbuck members.

It is another object of this invention to produce a sawbuck that will support a log during cutting without having to reposition the log as it is cut down.

It is a further object of this invention to produce a sawbuck that will ensure that the pieces being cut open the kerf and prevent binding the saw blade as it is cutting through the wood.

It is yet a further object of this invention to provide a sawbuck that can be readily used with conventional saw horses to provide a safe means for holding and cutting large logs or timbers.

It is another object of this invention to provide a sawbuck that can be readily assembled for use and disassembled for storage and packaging.

BRIEF DESCRIPTION OF THE INVENTION

The instant invention consists of a sawbuck that acts much like a vise. it is designed to attach to a post or a tree. Two plates are placed around the post and then bolted together. Spikes are placed on the plates to ensure a firm grip on the post and to prevent torsional motion when the sawbuck is under load. These spikes are firmly engaged with the bolts are properly tightened.

The vice is connected to the back of one of the clamp plates. The vice also has two plates (one being the back of the clamp plate). The free plate of the vice rides on two runners that connect to a crank mechanism. As the crank is turned, the free plate moves back and forth, to release or hold an object placed between the plates. These plates also have spikes to securely hold the work piece and to prevent rotation as the wood is cut.

The vice portion can also be used with sawhorses or other flat supports by bolting the runners to the saw horses with U-bolts, which will provide adequate holding strength for the sawbuck.

The device is designed to quickly assemble and disassemble by having the larger pieces bolt together. In this manner, the device can be packed in a fairly compact package for shipment and storage and still be easy to assemble for the user.

DETAILED DESCRIPTION OF THE PREFERRED EMBODIMENT

Figure 1:
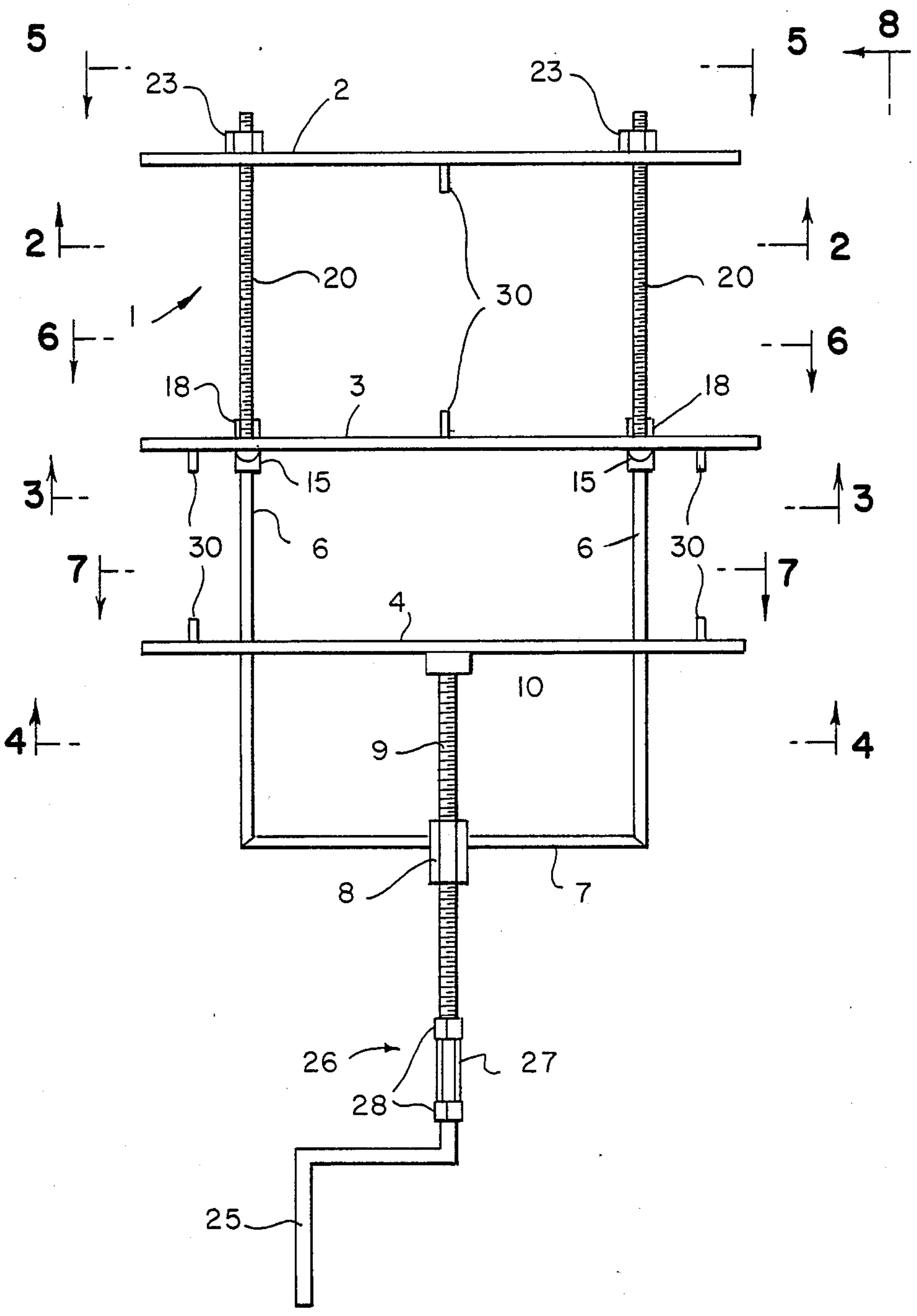
FIG. 1 is a top view of the invention.
Figure 2:
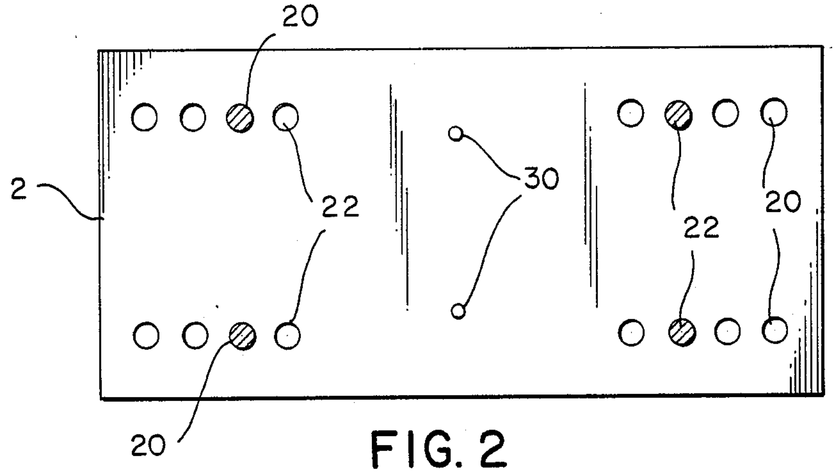
FIG. 2 is an elevation view showing the inner surface of the first clamp plate along the lines 2—2.

Referring now to the drawings, and particularly to FIG. 1, the sawbuck 1 consists of three plates that are connected to form a vice-clamp combination. The clamp portion uses a first clamp plate 2, and a second plate, that is common to the clamp and the vice portions, called the clamp-vice plate 3. The crank plate 4 is the movable part of the vice.

Figure 8:
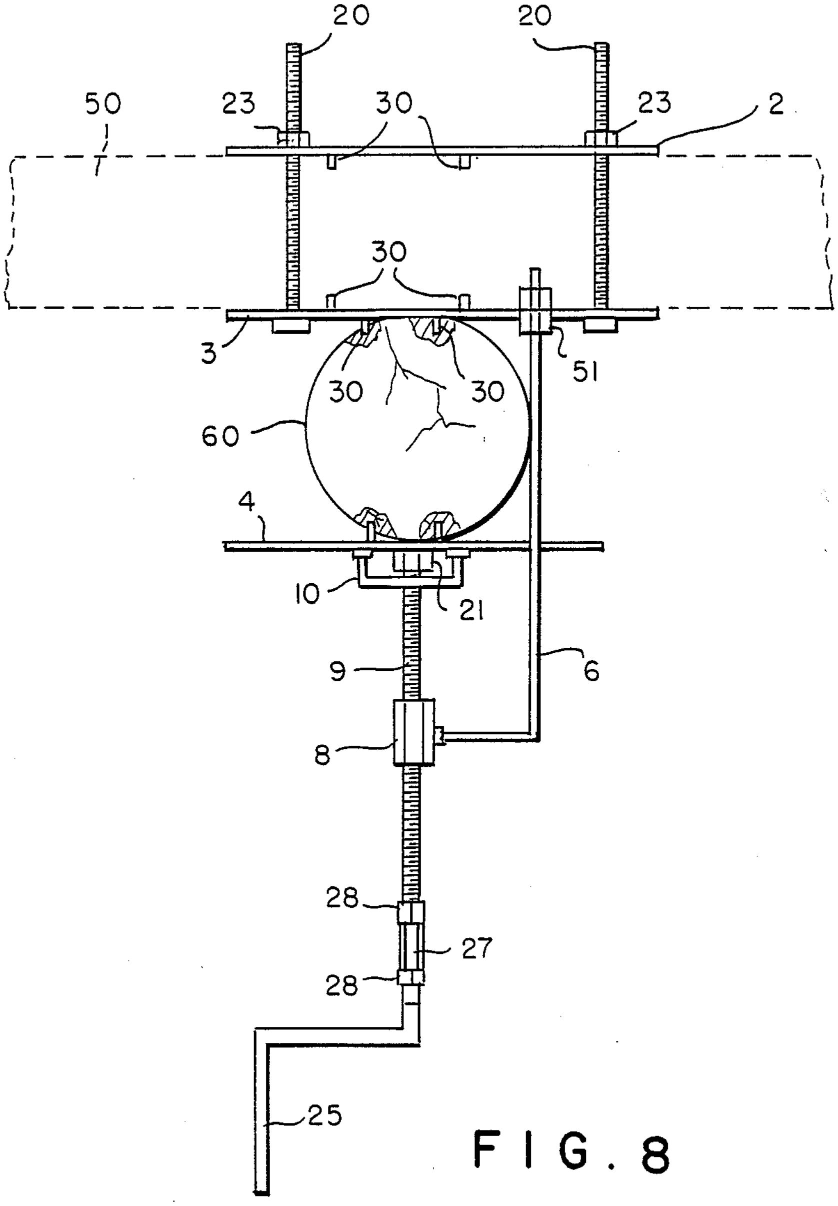
FIG. 8 is a side view of the invention along the lines 8—8.

A slider yoke 5 is formed as shown in the drawings. The slider yoke 5 has two extensions 6 and an cross piece 7, although in practice, the slider yoke is one continuous piece of metal. The cross piece 7 is welded to the crank nut 8 as shown in FIG. 8. The crank nut is a threaded hex bar that is approximately 2 inches long. The crank rod 9, which is a piece of all thread rod, is threaded through the crank nut until it extends out for some distance to allow the crank plate 4 to be connected to the crank rod 9. The crank plate is slipped over the extensions 6 by passing the extensions 6 through holes 11 in the crank plate 4. The crank plate 4 is then positioned against the crank rod 9 and the crank rod 9 is passed through the support bracket 10, located on the outer surface of the crank plate 4. The crank rod 9 is locked into the support bracket 10 with a NYLOCK nut as shown if FIG. 8. Once the crank plate 4 is locked to the crank rod 9, the crank plate 4 will travel back and forth along the extensions 6 as the crank rod 9 is turned.

Figure 3:
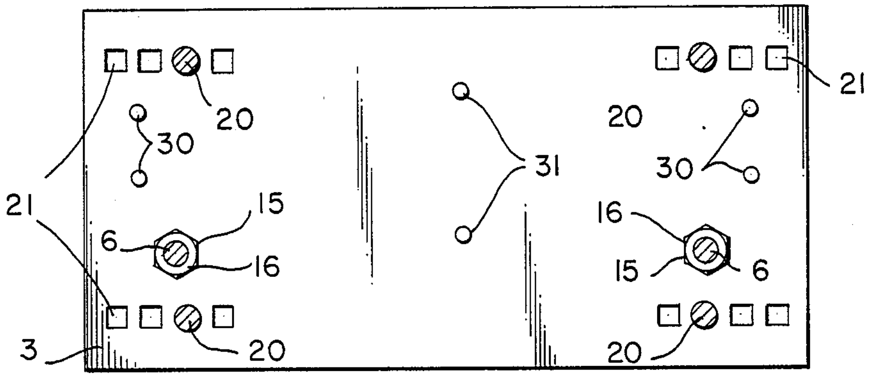
FIG. 3 is an elevation view showing the inner service of the clamp-vice plate along the lines 3—3.
Figure 4:
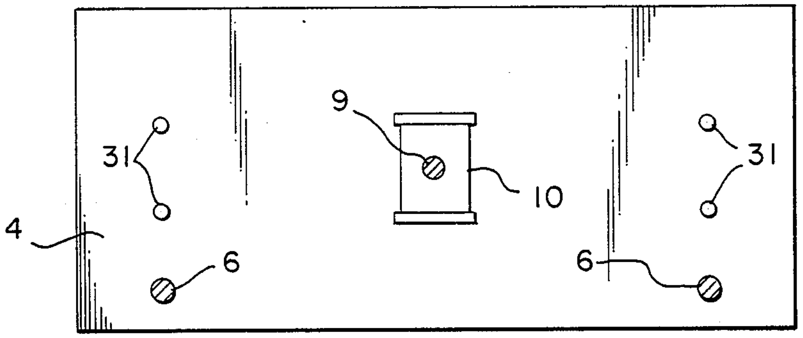
FIG. 4 is an elevation view showing the outer surface of the crank plate along the lines 4—4.
Figure 5:
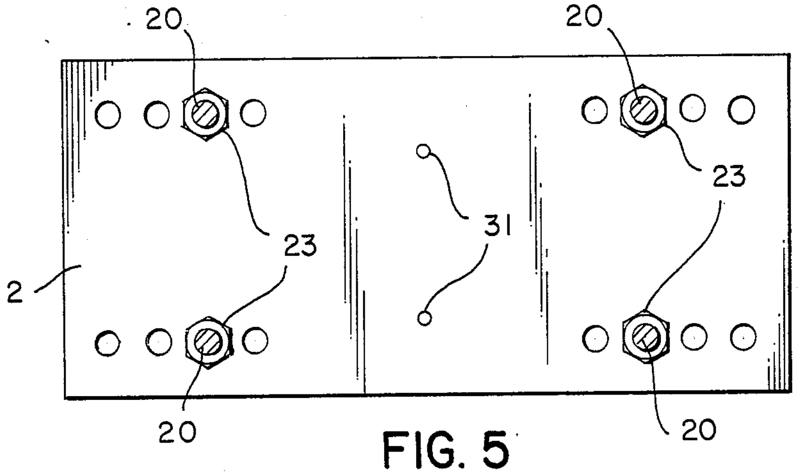
FIG. 5 is an elevation view of the outer view of the first clamp plate along the lines 5—5.
Figure 6:
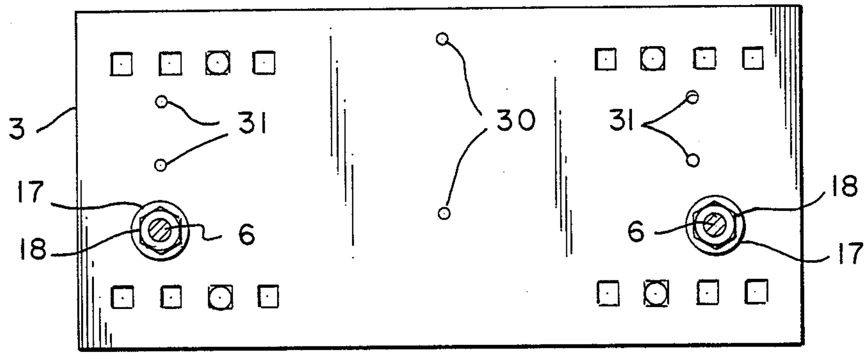
FIG. 6 is an elevation view of the outer surface of the clamp-vice plate along the lines 6—6.
Figure 7:
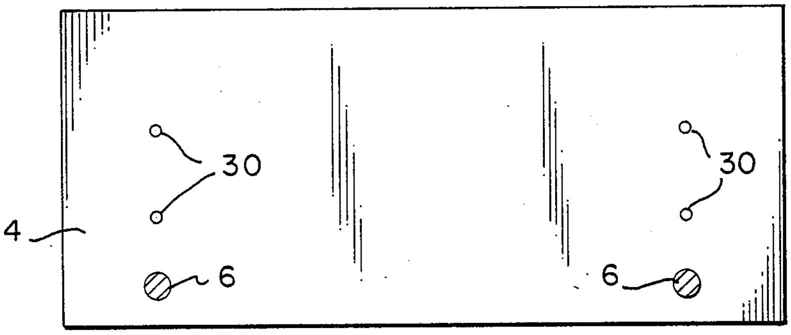
FIG. 7 is an elevation view of the inner surface of the crank plate along the lines 7—7.

The ends of the extensions 6 are threaded to allow the extensions 6 to be bolted to the clamp-vise plate 3. Although bolts are used in the preferred embodiment, all of the connections can be made using other fasteners, or by welding all of the parts together. A lock nut 15 is placed on the end of each extension 6 as shown in FIG. 8. The lock nut 15 prevents the clamp-vise plate 3 from sliding down the length of the extensions 6. The clamp-vise plate 3 is positioned on the extensions 6 be passing the extensions 6 through the holes 16 placed in the clamp-vise plate 3 as shown in FIG. 3. The clamp-vise plate 3 is secured to the extensions 6 with additional hardware as shown in FIG. 6. A washer 17 is placed over each extension 6 and then the extensions 6 are locked into place with lock nuts 18 as shown.

The clamp portion of the device is made up of the clamp-vise plate 3, and the clamp plate 2. Four carriage bolts 20 are used to tighten and secure the clamp portion to a post or tree. The clamp-vise plate 3 has a series of adjustment holes 21 placed therein, which allow the carriage bolts 20 to be positioned as needed to firmly fasten the device and to adjust for different width posts or tree trunks. The adjustment holes 21 placed in the clamp-vice plate 3 are square to fit the shank of the carriage bolts 20. A similar set of adjustment holes 22 is placed in the clamp plate 2 as shown. These holes are round to accommodate the round shanks of the carriage bolts 20. The clamp portion is secured with nuts 23, placed on the ends of the carriage bolts 20 as shown.

The clamp portion is installed by removing the clamp plate 2 from the device and then placing the clamp-vise plate 2 against a post or tree trunk. The clamp plate is then placed over the carriage bolts 20, through the appropriate set of adjustment holes for the size of post. The nuts 23 are then tightened down until the clamp is firmly locked in place.

The extensions 6 are placed over the carriage bolts 20 as shown to ensure that the plates have enough strength to support the extensions 6 when the extensions 6 are loaded with wood.

A crank 25 is connected to the crank rod 9 by lock-nut assembly 26, which consists of the crank receptor nut 27 and two locking hex nuts 28. The crank 25 is secured to the crank rod by placing a locking nut 28 onto the end of the crank 25 and then screwing the crank receptor nut 27 onto the crank 25. A second locking nut 28 is placed onto the crank rod 9 and then the crank rod 9 is screwed into the crank receptor nut 27 when the crank 25 and the crank rod 8 are fully seated within the crank receptor nut 27, the two locking nuts 28 are tightened into place against the crank receptor nut 27 as shown.

A series of spikes 30 are attached to the plates as shown. These spikes 30 can be welded to the plates or can be punched with a punch press during the sheet metal fabrication. An alternative for use in home built kits are sheet metal screws that are placed through holes drilled in the plates. The drawings show the heads 31 of these screws being placed on the opposite side of the spikes 30. The spikes 30 are designed to dig into the wood of the mounting tree or post and are designed to prevent or reduce the tendency of the device to rotate around the post as the load shifts with use. Similarly, the spikes 30 mountd on the clamp-vice plate 3 and the crank plate 4 are used to help support the log being cut and to prevent an inadvertent shift of the log while cutting.

Figure 9:
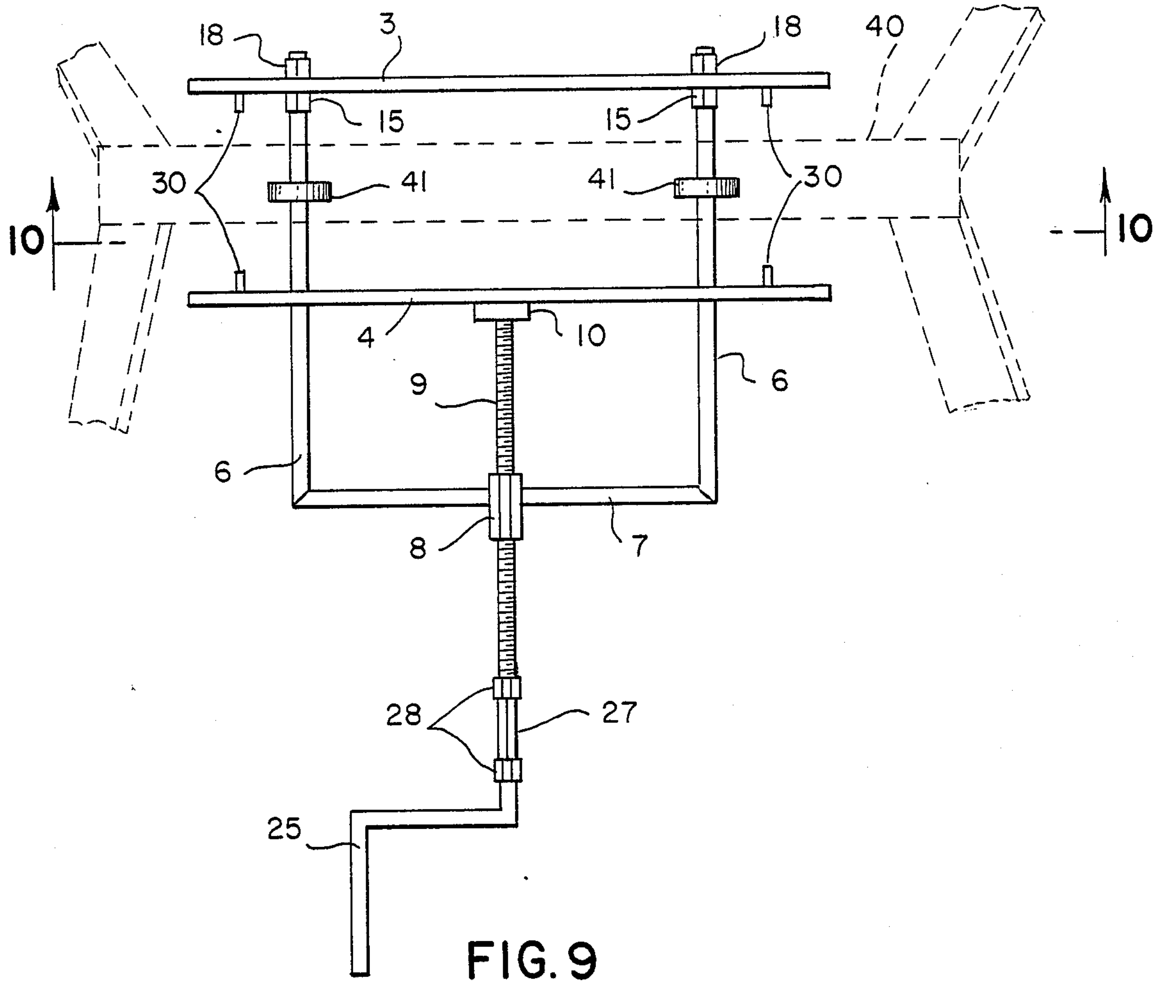
FIG. 9 is a detail of the device mounted on a sawhorse.
Figure 10:
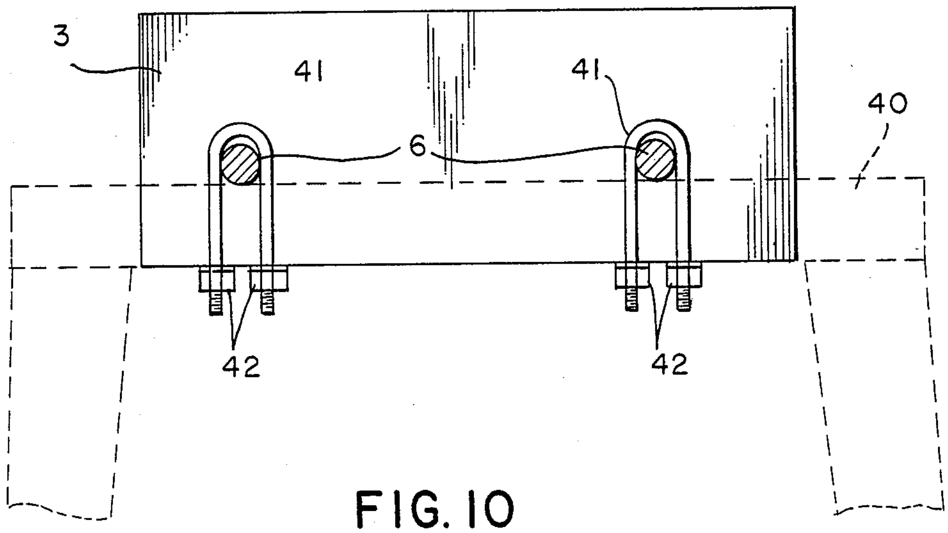
FIG. 10 is a plan view of the device as mounted on a sawhorse, along the lines 10—10.

Referring now to FIGS. 9 and 10, the device can also be used with a saw horse. In this mode, the first clamp plate 2, the carriage bolts 20 and the attendant hardware are removed. The remaining vice portion is placed on one saw horse 40 as shown, or two sawhorses turned at right angles to the one shown in the drawing. The two sawhorses would be aligned under the two crank rod pieces 6. When one sawhorse 40 is used as shown, two "U" bolts 41 are placed over the two crank rod pieces 5 as shown. The "U" bolts 41 are passed through holes drilled in the sawhorse and are secured with nuts 42 as shown. Once secured, the device can be used in the normal manner taking care to avoid the sawhorse 40 when cutting.

When using the device with a post or tree, the first clamp plate 2 is removed and the device is placed against a tree or post 50 as shown if FIG. 8, such that the clamp-vice plate 3 is butting up against the post or tree 50. The first clamp plate 2 is then replaced and the carriage bolts are tightened using nuts 23 until the device is tight and secure around the post of tree 50. The vice portion is then opened by turning the crank until the crank plate 4 is separated sufficiently from the clamp-vice plate to allow a log to be placed in the vice. A log 60 is then placed between the clamp-vice plate 3 and the crank plate 4 and the crank is turned until the crank plate 4 is firmly tightened against the log 60. The log 60 can now be cut from each end toward the center of the log 60 in any length desired. When the log is fully cut, the crank plate 4 is opened, the remaining log removed, and a fresh log is replaced. When finished cutting, the first clamp plate 2 is removed from the post or tree and the device is removed.

It is also possible to use the device as a standing vice to hold tools, e.g., a chain saw. To use the device in this manner, two thin boards must be placed over the spikes on the plates to protect the chain saw from the spikes. The vice can be closed and the chain saw will be held for blade sharpening or other maintenance. Similarly, any other large items such as pipes, bars or lumber can be held in the device for cutting. The vice can be easily set at a convenient working height for the particular user.

The device is designed to be disassembled for storage or shipment. Disassembly consists of unbolting the plates from the extensions 6 and removing the crank 25 from the lock-nut assembly 26. The separate pieces can then be stacked flat and packaged for easy shipment.

The present disclosure should not be construed in any limited sense other than that limited by the scope of the claims having regard to the teachings herein and the piror art being apparent with the preferred form of the invention disclosed herein and which reveals detals of structure of a preferred form necessary for a better understanding of the invention and may be subject to change by skilled persons within the scope of the invention without departing from the concept thereof.

I claim:

1. A sawbuck for use with vertical support members or sawhorses comprising:

(a) a clamp plate having a front, a back, and a perimeter, said clamp plate also being generally rectangular and having a plurality of holes placed around the perimeter;

(b) a center plate also having a front, a perimeter, and a back and being generally rectangular, said center plate also having a plurality of holes placed around the perimeter, said holes being aligned with the holesin the perimeter of said clamp plate;

(c) a plurality of bolts, said bolts also having nuts thereon, placed through the holesin the clamp and center plates, connecting said plates together in oppositely disposed planes, with the front of said center plate facing the clamp plate, said bolts having enough length to adjust the distance between the plates to enable the plates to act as a clmap when a vertical support member is placed between the plates and the nuts are securely tightened;

(d) two horizontal support members each having two ends, being oppositely disposed within the same horizontal plane, and being fixedly connected to the center plate at one end of said horizontal support members and extending outwardly from the back of said center plate in an opposite direction from the clamp;

(e) a tie bar, fixedly attached to the second end of each of the horizontal support members such that said horizontal support members and said tie bar form a yoke;

(f) a vice plate also having a front a back and a perimeter, said vice plate also being generally rectangular, said vice plate being slidably attached to said yoke; and (g) adjustment means fixedly attached to said yoke and said vice plate such that said vice plate can be moved with respect to said center plate, thereby forming a vice between the slidable vice plate and the back of the fixed center plate.

2. The device of claim 1 further comprising:

(a) a plurality of spikes fixedly attached to said plate members to bite into and hold wood members placed between said clamp or said vice when the vice or clamp are closed around said wood members.

3. The device of claim 1 further comprising clamp means to removably secure the horizontal support members to a sawhorse.

4. The device of claim 3 wherein said clamp means comprise a plurality of U-bolts, having nuts, said U-bolts being placed over the horizontal support members; and a sawhorse having a top plate, said top plate having a plurality of holes therein that correspond to the position of said U-bolts such that said U-bolts are placed through the holes in the top plate of the sawhorse and fastened thereon with the nuts.

5. The device of claim 2 further comprising two protector plates, said protector plates being placed adjacent to the vice plate and the center plate such that said protector plates are oppositely disposed and that said protector plates cover the spikes on said plate members.

6. The device of claim 5 wherein said protector plates are made of wood.

7. The device of claim 5 wherein said protector plates are made of high density plastic.

* * * * *